(12) United States Patent
Shibata

(10) Patent No.: US 9,367,273 B2
(45) Date of Patent: Jun. 14, 2016

(54) ELECTRONIC APPARATUS

(71) Applicant: BROTHER KOGYO KABUSHIKI KAISHA, Nagoya-shi, Aichi-ken (JP)

(72) Inventor: Hiroshi Shibata, Oobu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/610,056

(22) Filed: Jan. 30, 2015

(65) Prior Publication Data

US 2015/0220286 A1 Aug. 6, 2015

(30) Foreign Application Priority Data

Jan. 31, 2014 (JP) ................................. 2014-016440

(51) Int. Cl.
*G06F 3/12* (2006.01)

(52) U.S. Cl.
CPC ............ *G06F 3/1236* (2013.01); *G06F 3/1204* (2013.01); *G06F 3/1285* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 5,889,930 A * | 3/1999 | Fukudome | ............ | G06F 3/1293 340/4.3 |
| 7,050,184 B1 * | 5/2006 | Miyamoto | ......... | H04N 1/00127 358/1.13 |
| 8,312,122 B2 * | 11/2012 | Ishimoto | ............... | G06F 3/1285 358/3.28 |
| 8,379,537 B2 * | 2/2013 | Matsuda | ............. | H04L 41/0253 370/254 |
| 8,750,188 B2 * | 6/2014 | Nicoara et al. | ........ | H04W 48/18 370/252 |
| 2003/0204841 A1 * | 10/2003 | Nakane et al. | ............ | G06F 8/65 717/170 |
| 2004/0133553 A1 * | 7/2004 | Suto | ...................... | G06F 3/1203 |
| 2007/0011312 A1 * | 1/2007 | Nakamura | ............ | H04W 24/00 709/224 |
| 2007/0211310 A1 * | 9/2007 | Kadota | .............. | H04N 1/00344 358/474 |
| 2008/0055647 A1 * | 3/2008 | Kotake | ............... | G03G 15/5066 358/1.16 |
| 2009/0248849 A1 * | 10/2009 | Ishimoto | ............... | G06F 3/1285 709/223 |
| 2011/0019226 A1 * | 1/2011 | Tsujimoto | ............. | G06F 3/1203 358/1.15 |
| 2011/0075206 A1 * | 3/2011 | Ando | ................ | H04L 29/12028 358/1.15 |

(Continued)

FOREIGN PATENT DOCUMENTS

| | | |
|---|---|---|
| JP | 2006-333321 A | 12/2006 |
| JP | 2012-029139 A | 2/2012 |
| JP | 2012029139 A * | 2/2012 |

*Primary Examiner* — Ted Barnes
(74) *Attorney, Agent, or Firm* — Scully, Scott, Murphy & Presser, P.C.

(57) ABSTRACT

An MFP stores identification information and address information in correlation with each other for each interface. The MFP sends first identification information to a PC when receiving an inquiry of identification information from the PC through a first interface in preparation communication such as installation of a printer driver. In addition, when a request of address information using the first identification information is acquired from the PC, the MFP sends first address information corresponding to the first identification information in a case where the request of address information is acquired through the first interface, and sends second address information corresponding to second identification information in a case where the request of address information is acquired through a second interface.

10 Claims, 10 Drawing Sheets

(56) References Cited

U.S. PATENT DOCUMENTS

| | | | | |
|---|---|---|---|---|
| 2011/0261400 A1* | 10/2011 | Saito | G06F 3/1203 | 358/1.15 |
| 2012/0076022 A1* | 3/2012 | Shibata | H04L 43/0817 | 370/252 |
| 2012/0290420 A1* | 11/2012 | Close | G06Q 20/20 | 705/17 |
| 2012/0320401 A1* | 12/2012 | Shibata | H04L 63/083 | 358/1.14 |
| 2012/0320414 A1* | 12/2012 | Shibata | H04W 8/005 | 358/1.15 |
| 2012/0329511 A1* | 12/2012 | Keisu | H04L 41/0672 | 455/524 |
| 2013/0083340 A1* | 4/2013 | Asai | G06F 3/1204 | 358/1.13 |
| 2015/0134867 A1* | 5/2015 | Hildner | G06F 13/24 | 710/267 |
| 2015/0248264 A1* | 9/2015 | Bhatia et al. | G06F 3/1222 | 358/1.15 |

* cited by examiner

FIG. 3

| IF | IP |
|---|---|
| WIRED LAN I/F | 192.168.1.1 |
| WIRELESS LAN I/F | 192.168.2.1 |

| IF | TIME |
|---|---|
| WIRED LAN I/F | 2014/1/31 12:10:10 |
| WIRELESS LAN I/F | 2014/1/30 15:40:30 |

ELECTRONIC APPARATUS

CROSS-REFERENCE TO RELATED APPLICATION

This application claims priorities from Japanese Patent Application No. 2014-016440 filed on Jan. 31, 2014, the entire subject matter of which is incorporated herein by reference.

TECHNICAL FIELD

The present disclosure relates to an electronic apparatus including a plurality of interfaces for performing communication with an information processing apparatus through a network, and a program.

BACKGROUND

In the related art, an electronic apparatus such as a printer which has a plurality of interfaces (IFs) for performing communication with a personal computer (PC) through a network has been put into practical use. A computer program (hereinafter, referred to as a "device driver") for controlling the electronic apparatus is installed in the information processing apparatus.

As disclosed in JP-A-2006-333321, the device driver is installed through one interface selected from among the plurality of interfaces provided in the information processing apparatus. After the device driver is installed, data can be transmitted and received to and from the electronic apparatus through the selected interface.

However, the above-described related art may have the following problem. For example, as disclosed in JP-A-2006-333321, the device driver for the electronic apparatus is set up for a single selected interface when installed. Therefore, in a case where the device driver is installed through a certain interface, and thereafter, connection of the communication is changed to another interface different from the interface through which the device driver is installed, it may become difficult to establish appropriate communication with the electronic apparatus in the information processing apparatus.

SUMMARY OF THE INVENTION

The present disclosure has been made in view of the above circumstances, and one of objects of the present disclosure is to provide a technique in which appropriate communication with an electronic apparatus can be expected even in a case where an interface to be used for the communication with the electronic apparatus is changed in an information processing apparatus.

According to an illustrative embodiment of the present invention, there is provided an electronic apparatus including: a plurality of communication interfaces including a first communication interface and a second communication interface each of which configured to perform communication with an information processing apparatus through a network; a processor; and memory configured to store identification information for identifying the electronic apparatus and address information of the electronic apparatus in correlation with each other for each communication interface included in the communication interfaces. The memory stores instructions, when executed by the processor, causing the electronic apparatus to: receive an identification information inquiry from the information processing apparatus through the first communication interface in preparation communication that is performed prior to communication of target data with the information processing apparatus; send, to the information processing apparatus when the identification information inquiry is received, first identification information for identifying the electronic apparatus in performing communication with the information processing apparatus, wherein the first identification information is used when the communication through the first communication interface is performed; receive an address information request sent from the information processing apparatus using the first identification information due to a predetermined instruction for performing the communication of target data being input to the information processing apparatus; send, to the information processing apparatus, first address information corresponding to the first identification information in a case where the address information request is received through the first communication interface; send, to the information processing apparatus, second address information corresponding to second identification information for identifying the electronic apparatus in performing communication with the information processing apparatus through the second communication interface in a case where the address information request is received, wherein the second identification information is used when the communication through the second communication interface is performed; and perform the communication of the target data with the information processing apparatus after sending one of the first address information and the second address information to the information processing apparatus.

According to another illustrative embodiment of the present invention, there is provided a method for controlling an electronic apparatus, the electronic apparatus having a plurality of communication interfaces including a first communication interface and a second communication interface each of which configured to perform communication with an information processing apparatus through a network, and storing identification information for identifying the electronic apparatus and address information of the electronic apparatus in correlation with each other for each communication interface included in the communication interfaces. The method includes: receiving an identification information inquiry from the information processing apparatus through the first communication interface in preparation communication that is performed prior to communication of target data with the information processing apparatus; sending, to the information processing apparatus when the identification information inquiry is received, first identification information for identifying the electronic apparatus in performing communication with the information processing apparatus, wherein the first identification information is used when the communication through the first communication interface is performed; receiving an address information request sent from the information processing apparatus using the first identification information due to a predetermined instruction for performing the communication of target data being input to the information processing apparatus; sending, to the information processing apparatus, first address information corresponding to the first identification information in a case where the address information request is received through the first communication interface; sending, to the information processing apparatus, second address information corresponding to second identification information for identifying the electronic apparatus in performing communication with the information processing apparatus through the second communication interface in a case where the address information request is received, wherein the second identification information is used when the communication through the second communication interface is performed; and performing the communication of the target data with the information processing apparatus after sending one of the first address information and the second address information to the information processing apparatus.

According to another illustrative embodiment, there is provided a non-transitory computer-readable medium having instructions to control an electronic apparatus. The electronic apparatus is provided with a plurality of communication interfaces including a first communication interface and a second communication interface each of which configured to perform communication with an information processing apparatus through a network, and stores identification information for identifying the electronic apparatus and address information of the electronic apparatus in correlation with each other for each communication interface included in the communication interfaces. The instructions causes the electronic apparatus to perform: receiving an identification information inquiry from the information processing apparatus through the first communication interface in preparation communication that is performed prior to communication of target data with the information processing apparatus; sending, to the information processing apparatus when the identification information inquiry is received, first identification information for identifying the electronic apparatus in performing communication with the information processing apparatus, wherein the first identification information is used when the communication through the first communication interface is performed; receiving an address information request sent from the information processing apparatus using the first identification information due to a predetermined instruction for performing the communication of target data being input to the information processing apparatus; sending, to the information processing apparatus, first address information corresponding to the first identification information in a case where the address information request is received through the first communication interface; sending, to the information processing apparatus, second address information corresponding to second identification information for identifying the electronic apparatus in performing communication with the information processing apparatus through the second communication interface in a case where the address information request is received, wherein the second identification information is used when the communication through the second communication interface is performed; and performing the communication of the target data with the information processing apparatus after sending one of the first address information and the second address information to the information processing apparatus.

BRIEF DESCRIPTION OF THE DRAWINGS

In the accompanying drawings:

FIG. 3 is a diagram illustrating a configuration of an IP address management table of the MFP;

FIG. 8 is a diagram illustrating a configuration of a response information management table of the MFP;

DETAILED DESCRIPTION

Hereinafter, illustrative embodiments of the present disclosure will be described in detail with reference to the drawings. In the following descriptions, an image processing system according to an embodiment will be described with reference to the accompanying drawings. The embodiment described in below is a case where the present invention is applied to an image processing system which includes a multi-function peripheral (MFP) having a plurality of interfaces and a PC connected to the MFP.

Figure 1:
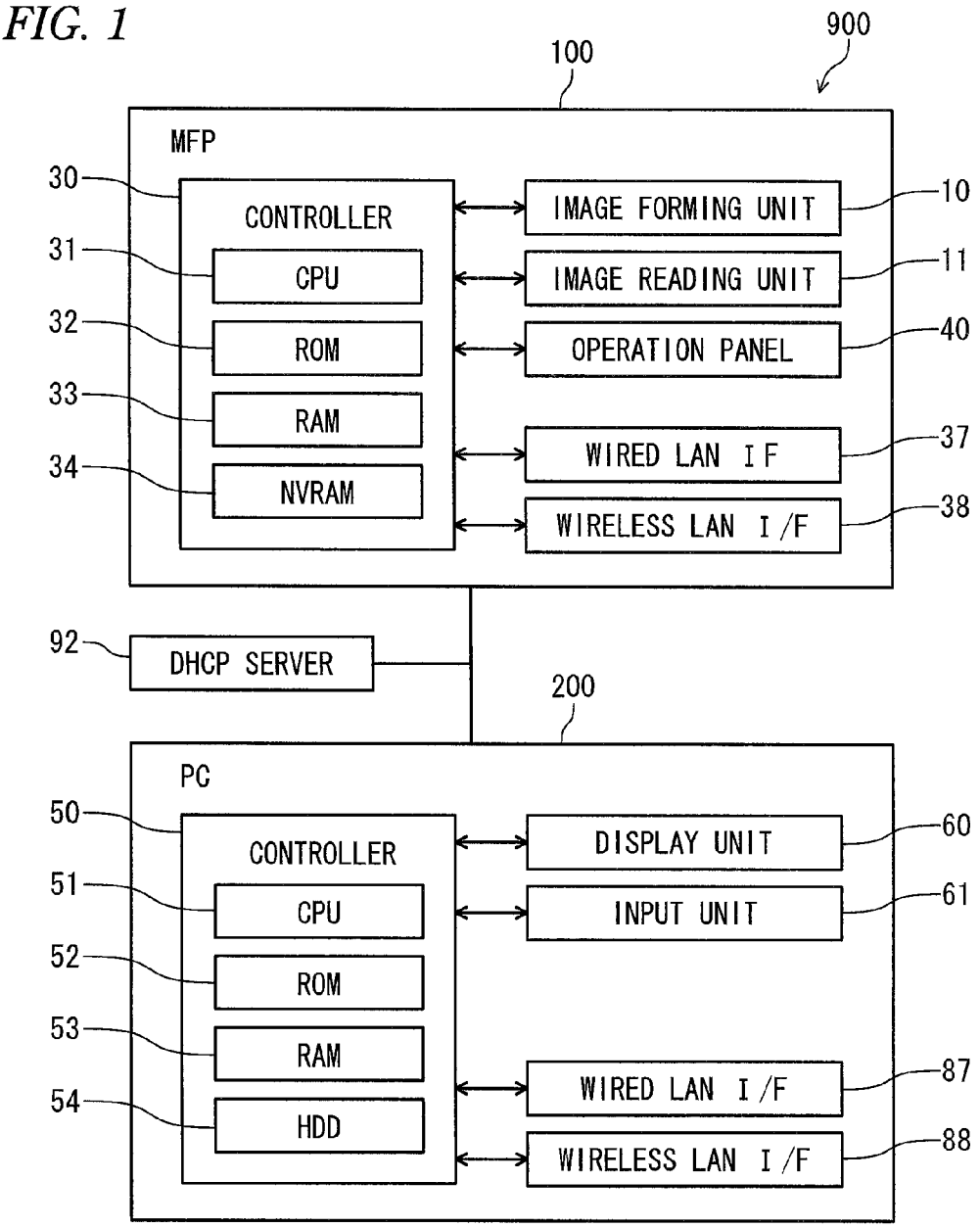
FIG. 1 is a block diagram illustrating electrical configurations of an MFP and a PC forming an image processing system according to an embodiment of the present disclosure.

An image processing system 900 according to the embodiment, as illustrated in FIG. 1, is provided with an MFP 100 and a PC 200 which are connected to each other through a network. The MFP 100 is an example of an electronic apparatus. The PC 200 is an example of an information processing apparatus. An electronic apparatus that is provided in the image processing system 900 should not be limited to the MFP 100, but, for simplification of description, FIG. 1 illustrates only the MFP 100. An information processing apparatus which communicates with the MFP 100 should not be limited to the PC 200, but, for simplification of description, FIG. 1 illustrates only the PC 200.

The image processing system 900 is also provided with a dynamic host configuration protocol (DHCP) server 92 that is connected to the MFP 100 and the PC 200 through a network such as a wired LAN. When a certain apparatus is connected to the wired LAN, the DHCP server 92 automatically allocates an IP address to the apparatus. In the embodiment, IPv4 may be used to define an IP address of each apparatus connected through the network. Further, the image processing system 900 may be connected to other server apparatus such as a print server and a domain name system (DNS) server.

Next, a schematic configuration of the MFP 100 will be described. As illustrated in FIG. 1, the MFP 100 has a controller 30 which is configured by computer hardware including a CPU 31, a ROM 32, a RAM 33, and a nonvolatile RAM (NVRAM) 34. The controller 30 of FIG. 1 is a generic term for a collection of hardware such as the CPU 31 used to control the MFP 100, and should not be limited to represent a single piece of hardware which is provided in the MFP 100.

The ROM 32 stores firmware which is a control program for controlling the MFP 100, various settings, initial values, and the like. The RAM 33 and the NVRAM 34 are used as work areas to which various control programs are read, or storage areas in which data is temporarily stored.

The CPU 31 controls other hardware provided in the MFP 100 while performing a processing by running a control program read from the ROM 32 and in accordance with signals received from various sensors, and stores a process result in the RAM 33 or the NVRAM 34.

The MFP 100 is provided with an image forming unit 10 that is configured to print an image on paper, an image reading unit 20 which reads an image of an original document, an operation panel 40 which has both a display function and an input function, a wired LAN interface 37, and a wireless LAN interface 38, which are controlled by the CPU 31.

The image forming unit 10 may perform color printing, and may perform only monochrome printing. In the embodiment, the image forming unit 10 is assumed to be capable for color printing. Regarding a printing method, an electrophotographic method and an ink jet method may be used. The image reading unit 20 may be configured to be capable of performing color scanning, or to be capable of only monochrome scanning. In the embodiment, the image reading unit 20 is assumed to be capable of color scanning. A reading mechanism provided in the image reading unit 20 may be a CCD or a CIS.

The operation panel 40 is provided on an exterior of the MFP 100, and includes various buttons for receiving an input operation by a user and a touch panel which displays a message or set content. The various buttons include, for example, an enter button for inputting an instruction for starting an image process, and a cancel button for inputting an instruction for cancelling the image process. In addition, various instructions can be input by a user touching the touch panel, and, for example, various settings or user information are input through the touch panel.

The wired LAN interface 37 is hardware which enables communication to be performed with an external device through a communication cable such as a copper wire or an optical fiber. The wireless LAN interface 38 is hardware which enables communication to be directly performed between devices through wireless communication, or to be performed with an external device through a relay device such as an access point. The MFP 100 transmits and receives data or a command to and from an external device through the wired LAN interface 37 or the wireless LAN interface 38.

A communication method using the wireless LAN interface 38 is preferably based on standards of IEEE802.11 and standards conforming thereto. The wireless LAN interface 38 of the embodiment is an interface using a WiFi Direct (WFD) method which enables wireless communication to be performed with the PC 200 without using an access point.

The WFD method is a communication method in which a network connection is configured and established by a group owner apparatus (GO apparatus) which manages the network, more specifically, which functions as an access point, and a client apparatus, and data can be transmitted and received within the network. For this reason, when data communication is performed with an external device through the wireless LAN interface 38, it is necessary to establish wireless communication with the external device and to build a WFD network. In the embodiment, for example, when the WFD network is configured, the MFP 100 becomes to serve as a GO apparatus, and the PC 200 becomes to serve as a client apparatus. The client apparatus is not limited to the PC 200, and other apparatuses may belong to the WFD network as client apparatuses. The GO apparatus stores identification information of a client apparatus, and connection information for establishing wireless communication based on the WFD method.

The GO apparatus serves as a DHCP server which automatically allocates an IP address to a client apparatus. For example, if the MFP 100 serves as a GO apparatus, the MFP 100 determines IP addresses of the MFP 100 and the PC 200 which is a client apparatus. Further, the DHCP server 92 which has a connection using a wired LAN does not allocate an IP address which is used in the wireless LAN interface 38 to the MFP 100.

As described above, the MFP 100 is provided with a plurality of interfaces which perform communication by using IP addresses. In addition, in the MFP 100, an IP address can be allocated to each interface. Therefore, the MFP 100 stores a node name which is information for identifying the MFP 100 and an IP address which is address information of the MFP 100 in correlation with each other as information of each interface. The node name is an example of identification information. The IP address is an example of address information.

Figure 2:
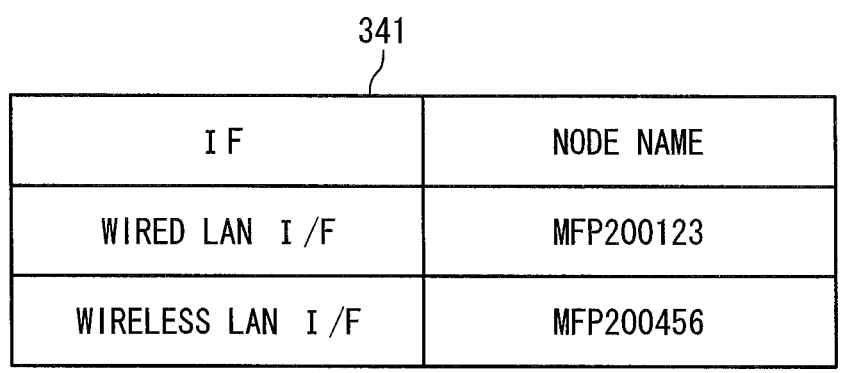
FIG. 2 is a diagram illustrating a configuration of a node name management table of the MFP.

The MFP 100 has a table 341 which stores an interface of the MFP 100 and a node name in correlation with each other in a nonvolatile memory area as illustrated in FIG. 2. The node name is information unique to an interface and is information which is stored during shipment. The MFP 100 has a table 331 which stores an interface of the MFP 100 and an IP address in correlation with each other in the nonvolatile memory area as illustrated in FIG. 3. In the embodiment, the IP address is information which can be dynamically allocated, and, for example, the wired LAN interface 37 is set by the DHCP server 92, and the wireless LAN interface 38 is set by a GO apparatus. In other words, the IP address is information which can be rewritten by turning power on and off. The table 341 and the table 331 are examples of a storage unit.

The MFP 100 may be provided with three or more interfaces as interfaces connected to the PC 200. For example, the MFP 100 may be provided with a wireless LAN interface using an indirect WiFi method (normal WiFi method) which enables wireless communication to be performed with the PC 200 through an access point separately from a wireless LAN interface using the WFD method. In this case, the MFP 100 treats the wireless LAN interface using the normal WiFi method as an interface different from the wireless LAN interface using the WFD method, and stores a node name and an IP address for the wireless LAN interface using the normal WiFi method. In the normal WiFi method, an IP address is allocated by the DHCP server 92. Further, not only the above-described form but also a form in which two wireless LAN interfaces using the normal WiFi method and the WFD method without employing a wired LAN interface may be employed.

Next, a schematic configuration of the PC 200 will be described. The PC 200 is provided with, as illustrated in FIG. 1, a controller 50 which includes a CPU 51 that performs various processes, a ROM 52 that stores a program (BIOS) and the like for a starting process performed by the CPU 51 when the PC 200 is started, a RAM 53 that is used as a temporary storage area when the CPU 51 performs various processes, and a hard disk drive (HDD) 54 that stores various programs or data. The controller 50 of FIG. 1 is described as a generic term for indicating a collection of hardware such as the CPU 51 used to control the printer, and may not only represent a single piece of hardware which is provided in the PC 200.

The PC 200 is provided with a display unit 60 configured by a liquid crystal display or the like, an input unit 61 configured by a keyboard, a mouse, and the like, a wired LAN interface 87, and a wireless LAN interface 88, which are controlled by the controller 50.

The wired LAN interface 87 and the wireless LAN interface 88 are hardware which enables communication to be performed with an external device in the same manner as the wired LAN interface 37 and the wireless LAN interface 38 of the MFP 100. The PC 200 transmits and receives data or a command to and from an external device through the wired LAN interface 87 or the wireless LAN interface 88.

The wired LAN interface 87 is an interface using the same communication method as that of the wired LAN interface 37 of the MFP 100. Further, the wireless LAN interface 88 is an interface using the same communication method as that of the wireless LAN interface 38 of the MFP 100.

The PC 200 also has a table which stores a node name for each interface of the PC 200 in a nonvolatile memory area, and a table which stores an IP address for each interface of the PC 200 in the nonvolatile memory area. The node name is information unique to each interface of the PC 200, and the IP address is dynamically allocated information.

The PC 200 stores an operating system (OS), application programs (document creation software, drawing software, spreadsheet software, picture data editing software, and the like), and a device driver for controlling various electronic apparatuses. Further, regarding the various programs, the programs stored on a recording medium such as a CD-ROM may be installed, or the programs stored in a server on a network may be downloaded and installed.

Figure 4:
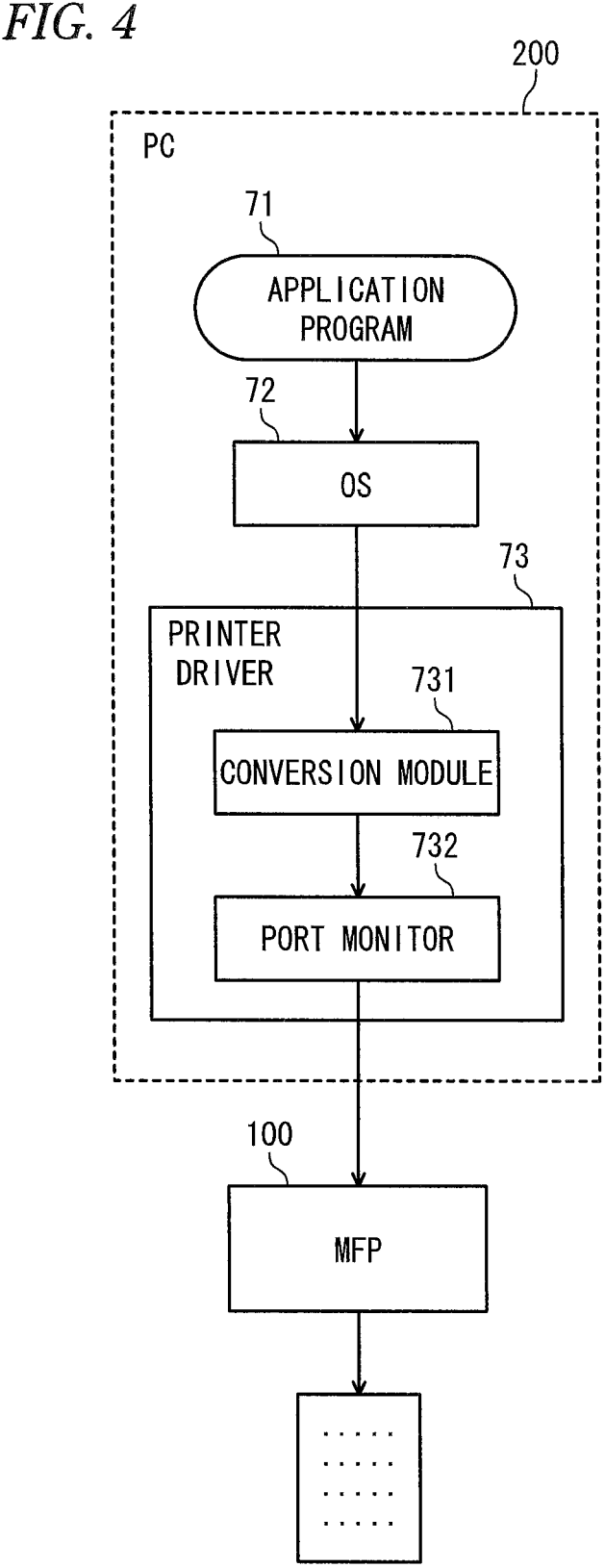
FIG. 4 is a diagram illustrating a configuration of a printer driver and data transition.

A printer driver 73 which is a device driver for printing in the MFP 100 is installed in the PC 200 of the embodiment. The printer driver 73 includes, as illustrated in FIG. 4, a conversion module 731 which converts printing target data which is sent from an application program 71 through an OS 72, into printing data which is printing image data, and a port monitor 732 which transmits the printing data converted by the conversion module 731 to the MFP 100. The port monitor 732 stores a node name of each interface of the MFP 100 which is a communication destination. An operation of the PC 200 including the printer driver 73 will be described later in detail.

Next, with reference to a sequence diagram of FIG. 5, a description will be made of an operation procedure when the PC 200 requests the MFP 100 to perform printing in the image processing system 900 of the embodiment. In addition, in the sequence diagram of FIG. 5, it is assumed that the PC 200 is connected to the MFP 100 in advance through a wired LAN, and the printer driver 73 is not installed in the PC 200.

First, an installation command of the printer driver 73 is input to the PC 200, and the PC 200 executes an installation program (installer). The installer installs the printer driver 73 in the PC 200.

The PC 200 broadcasts an inquiry of a node name in the network through the wired LAN interface 87 during the installation. The printer which receives the inquiry sends a response of a node name corresponding to the wired LAN interface of the printer, to the PC 200. For example, the MFP 100 which receives the inquiry through the wired LAN interface 37 sends a response of a node name of the wired LAN interface stored in the table 341. Further, communication during the installation performed by the installer is an example of preparation communication. The node name is an example of identification information including first identification information and second identification information. The process in which the MFP 100 sends a response of the node name is an example of a process performed by an identification information supply unit.

The PC 200 also acquires an IP address of the wired LAN interface 37 of the MFP 100 based on a communication packet during the response. The IP address is an example of address information including first address information and second address information.

The PC 200 displays printers corresponding to the printer driver 73 in a form of a list among printers which have sent the response, and receives designation of printers to be used. In addition, node names of designated printers are registered in the port monitor 732. In other words, the PC 200 stores node names of wired LAN interfaces of the designated printers in the nonvolatile storage area. An IP address is information which can be dynamically allocated. Hereinafter, it is assumed that the MFP 100 is designated.

After the printer driver 73 is installed, the PC 200 receives a printing command. When the printing command is received by using a port of the wired LAN, the PC 200 erases a cache if there is the cache which is a record during previous communication. In addition, in a case where a cache is not created or is not used, erasure of a cache is not necessary.

Next, the PC 200 performs name resolution by using the node name registered in the port monitor 732 during the installation. In other words, an inquiry of an IP address for the corresponding node name is broadcasted in the network. In the embodiment, the name resolution is performed by using the node name of the wired LAN interface of the MFP 100. In the embodiment, since a cache is erased when the printing command is received, the name resolution is performed when the printing command is received. The name resolution is a process of acquiring information regarding an IP address corresponding to identification information of a device (for example, a node name of the device). In the embodiment, a configuration is employed in which a device (in the embodiment, the MFP 100) which is a communication partner performs the name resolution. Specifically, a configuration for name resolution of NetBios is used. However, the embodiment is not limited to a specific configuration of the name resolution method, and other types name resolution methods such as LLMNR may be used.

The MFP 100 receives the inquiry of a node name from the PC 200, and checks whether or not the inquired node name is stored in the MFP 100. In addition, if the MFP 100 has the inquired node name, the MFP 100 sends a response of the present IP address corresponding to an interface which has received the inquiry to the PC 200.

Figure 5:
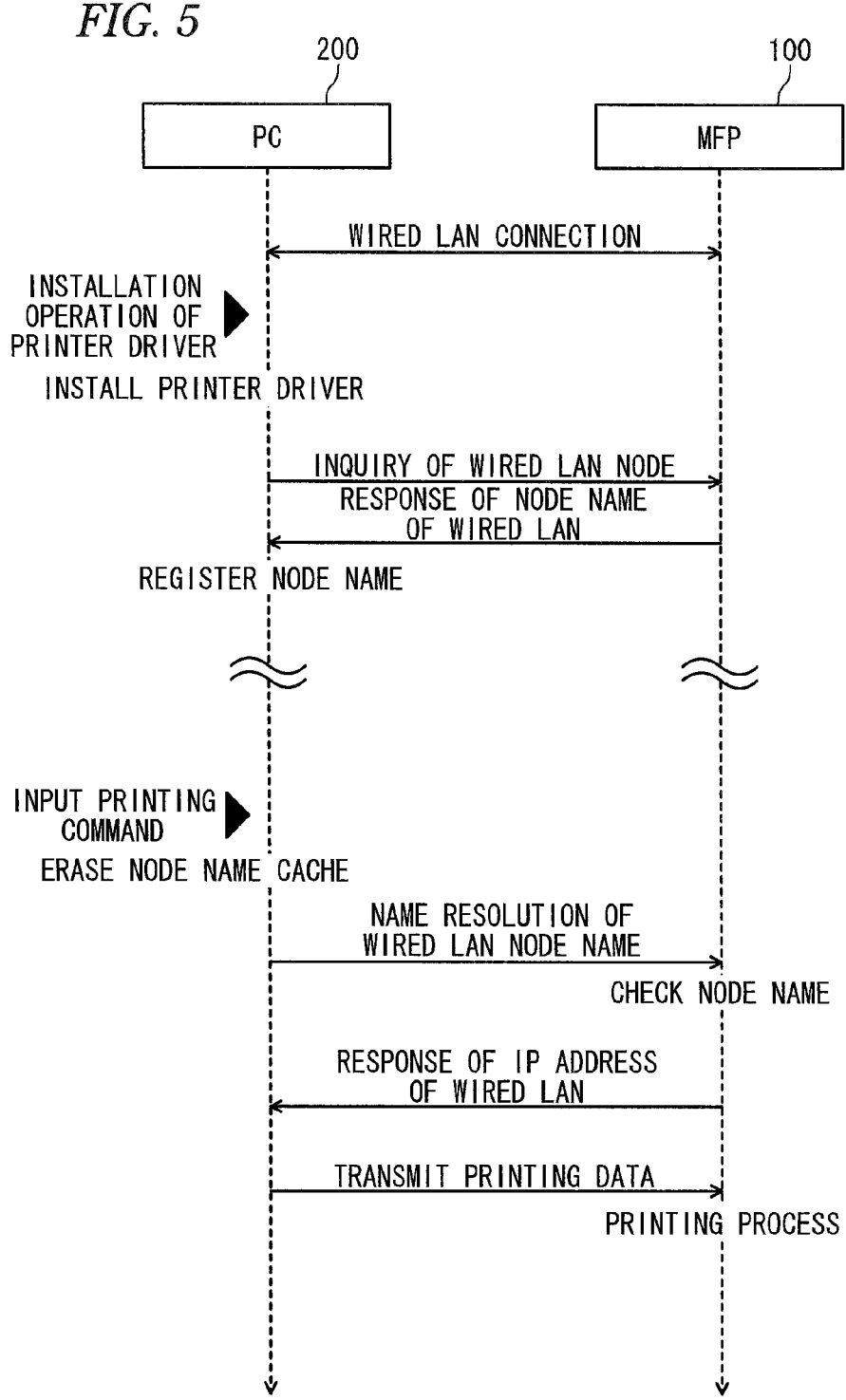
FIG. 5 is a sequence diagram illustrating a printing procedure in the image processing system according to the embodiment in a case where interfaces are the same as each other during installation and during printing.

Specifically, in a state illustrated in FIG. 5, the PC 200 and the MFP 100 are connected to each other through the wired LAN, and thus the MFP 100 receives the inquiry of name resolution through the wired LAN interface 37. For this reason, in the name resolution using the node name of the wired LAN interface, the inquired node name matches the node name of the wired LAN interface of the MFP 100, and thus the MFP 100 sends a response of the present IP address corresponding to the wired LAN interface 37 to the PC 200. The process in which the MFP 100 sends a response of the IP address is an example of a process performed by an address information supply unit.

The PC 200 transmits printing data to the MFP 100 through the wired LAN interface 87 by using the acquired IP address. In other words, the IP address for the wired LAN interface is acquired, and thus communication of the printing data is performed by using the IP address. The MFP 100 performs a printing process based on the received printing data. The process in which the MFP 100 receives the printing data is an example of a process performed by a target data communication unit. Consequently, the printing operation is completed.

The above-described printing operation of FIG. 5 corresponds to a case where an interface used for communication during installation is the same as an interface used for communication during printing. Next, with reference to a sequence diagram of FIG. 6, a description will be made of a case where an interface used for communication during installation is different from an interface used for communication during printing. In addition, in FIG. 6, it is assumed that connection using a wired LAN is performed during installation, the connection using the wired LAN is turned to disconnection after the installation, and connection occurs through a wireless LAN before printing. For this reason, an operation during installation, that is, an operation in which designation of a printer to be used is received and a node name is registered in the port monitor 732 is the same as that in FIG. 5, and description thereof will not be repeated.

After the printer driver 73 being installed, the PC 200 receives a printing command, first, the PC 200 erases a cache in the same manner as in the printing operation of FIG. 5. Since the cache is erased, using an IP address of the wired LAN interface to which the PC 200 is connected hitherto is avoided.

Next, the PC 200 performs name resolution by using the node name of the wireless LAN interface, which is a node name stored during the installation of the printer driver 73. In other words, the name resolution is performed by using a node name of an interface different from the interface used for communication during printing.

Figure 6:
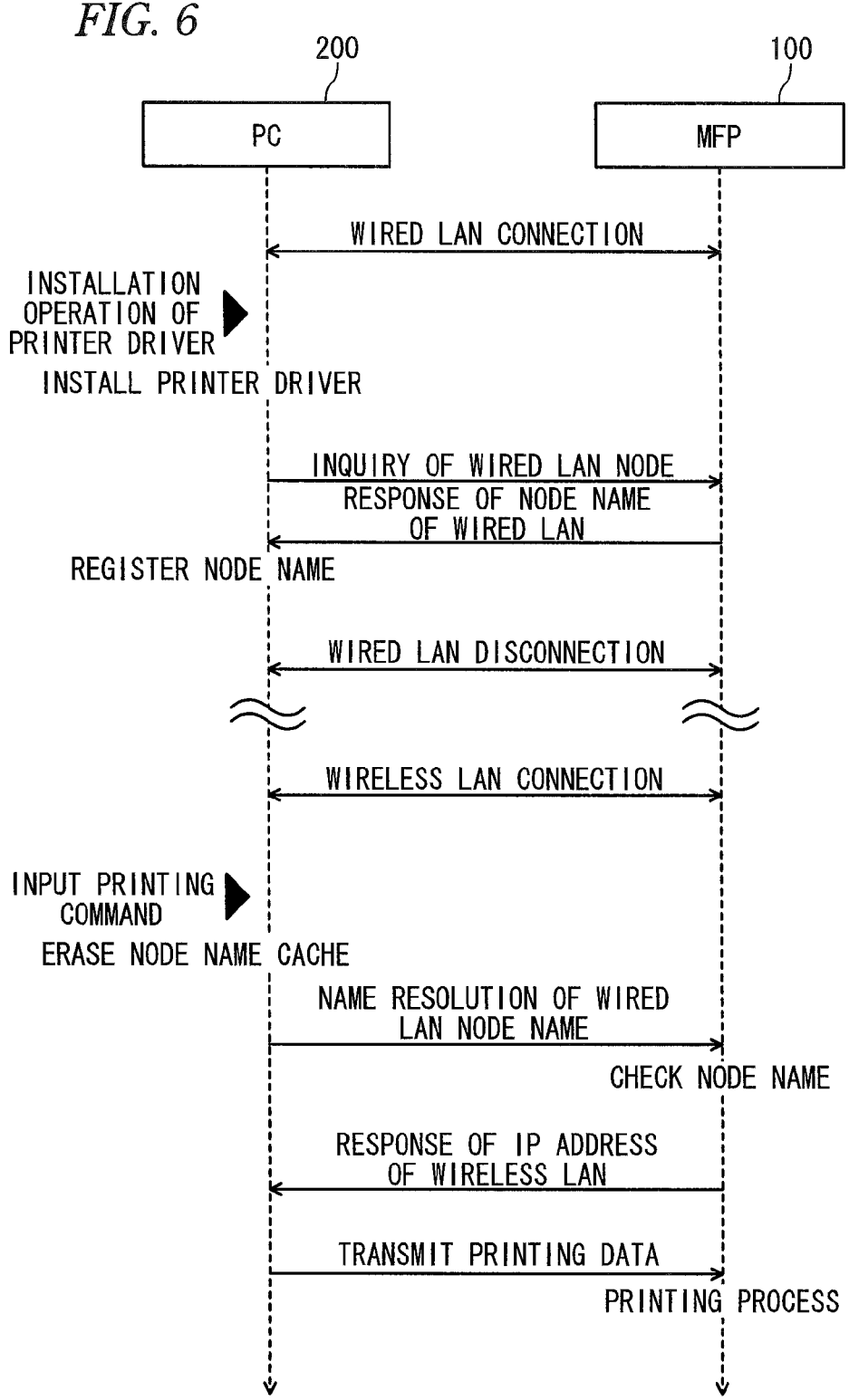
FIG. 6 is a sequence diagram illustrating a printing procedure in the image processing system according to the embodiment in a case where interfaces are different from each other during installation and during printing.

Specifically, in a state illustrated in FIG. 6, when a printing command is input, the PC 200 and the MFP 100 are connected to the wireless LAN, and thus the MFP 100 receives an inquiry of name resolution through the wireless LAN interface 38. In this case, a node name used for the name resolution is a node name of the wired LAN interface. For this reason, the inquired node name does not match the node name of the wireless LAN interface of the MFP 100. However, since the inquired node name is the node name of the wired LAN interface of the MFP 100, the MFP 100 has the inquired node name. For this reason, the MFP 100 can specify that there is a request for name resolution addressed to the MFP 100. Therefore, the MFP 100 sends a response of the present IP address corresponding to the wireless LAN interface 38 which receives the inquiry of the name resolution, in relation to the inquiry of the name resolution from the PC 200.

The PC 200 transmits printing data to the MFP 100 through the wireless LAN interface 88 by using the acquired IP address. In other words, the IP address for the wireless LAN interface is acquired, and thus communication of the printing data is performed by using the IP address. That is, the PC 200 transmits the printing data from the interface different from the interface during the installation. The MFP 100 performs a printing process based on the received printing data. Consequently, the printing operation is completed.

In other words, in the image processing system 900 of the embodiment, name resolution is performed by using a node name which is acquired by the PC 200 during installation. In addition, even in a case where an inquired node name does not match a node name of an interface which receives the inquiry, the MFP 100 sends a response of an IP address corresponding to an interface which receives the inquiry in a case where the node name matches a node name of another interface which is stored. Consequently, in the image processing system 900, even if the PC 200 receives a printing command in a state of being connected to an interface different from an interface during installation, printing data can be transmitted through a currently communicable interface.

Figure 7:
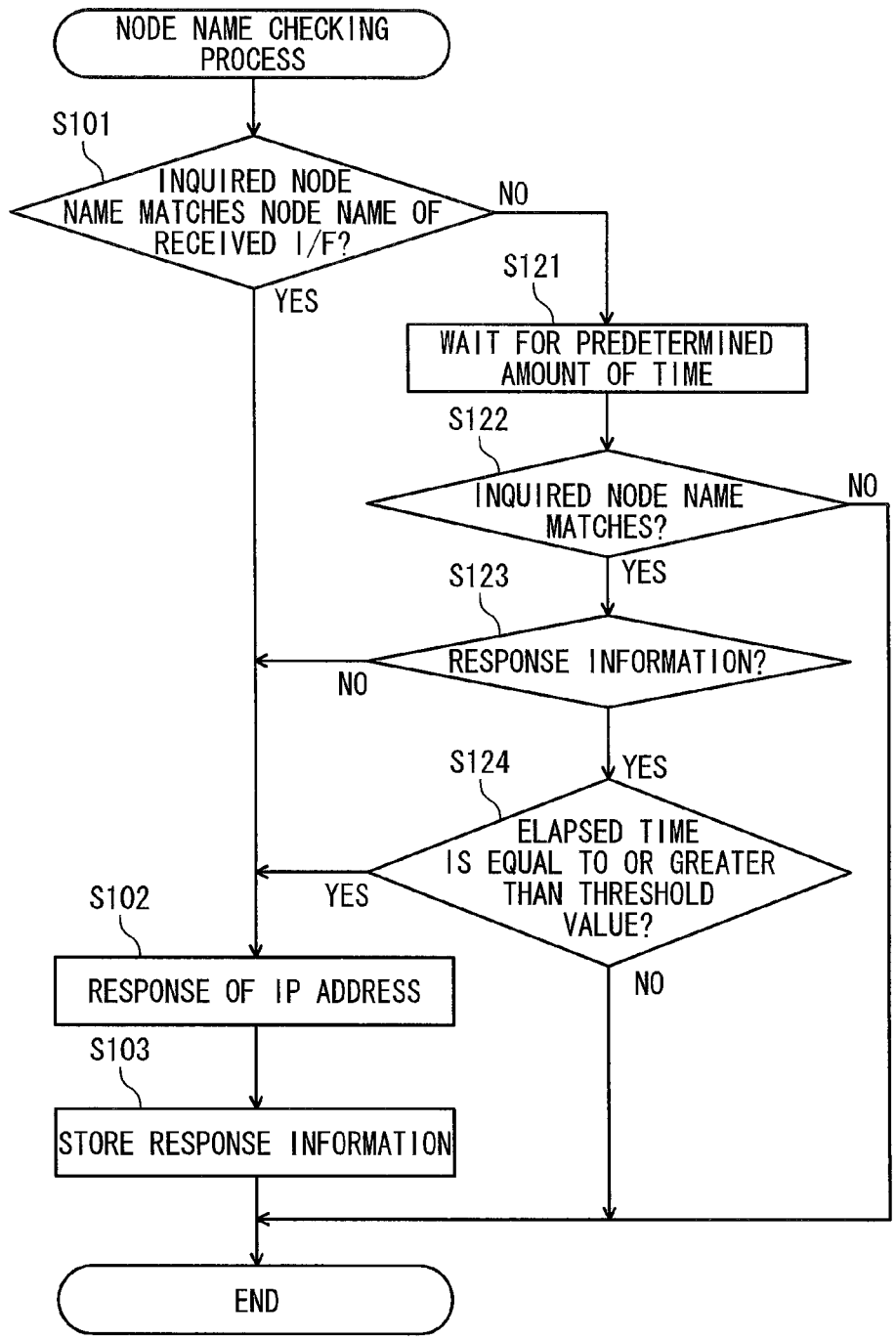
FIG. 7 is a flowchart illustrating a procedure of a node name checking process performed by the MFP of the embodiment.

Next, among processes of the MFP 100 for realizing a printing operation of the above-described image processing system 900, a description will be made of the node name checking process which is performed when an inquiry of name resolution is received, with reference to a flowchart of FIG. 7. The node name checking process is performed by the CPU 31 when an inquiry of name resolution is received.

In the node name checking process, first, it is determined whether or not an inquired node name matches a node name of an interface which receives the inquiry (step S101).

If the inquired node name matches the node name of the interface which receives the inquiry (YES in step S101), a response of an IP address corresponding to the interface which receives the inquiry is sent (step S102).

After step S102, response information which is information of the apparatus which performs the inquiry of the name resolution is stored (step S103). Specifically, the response information includes information regarding a time at which the response is sent. The MFP 100 has a response information management table 332 which stores the response information in correlation with an interface through which a response of the IP address has been sent, in a nonvolatile memory area or a volatile memory area as illustrated in FIG. 8. In step S103, the information is stored in the response information management table 332. The response information management table 332 is an example of a response information storage unit. When step S103 is executed, the node name checking process is finished.

On the other hand, if the inquired node name does not match the node name of the interface which receives the inquiry (NO in step S101), waiting occurs for a predetermined amount of time (step S121). In the embodiment, in a case where the MFP 100 and the PC 200 are connected to each other through both the wired LAN and the wireless LAN, that is, through a plurality of interfaces, the inquiry of the name resolution is received from the plurality of interfaces. For this reason, the waiting time is prepared in order to prioritize a response of name resolution using an interface whose node name matches the inquired node name. The predetermined amount of time may be, for example, one second.

In addition, in a case where the inquiry of name resolution is received from the plurality of interfaces, the node name checking process is performed in parallel for each of the respective interfaces having received the inquiry. In other words, the node name checking process is performed multiple times.

The predetermined amount of time in step S121 may be different for each interface. For example, if the predetermined amount of time becomes longer in an interface having low communication stability, an interface having high communication stability can be prioritized to an interface having low communication stability. Specifically, in a case where there are three interfaces including a wired LAN interface, a wireless LAN interface using the WFD method, and a wireless LAN interface using the normal WiFi method, communication stability is given as follows: the wired LAN interface>the wireless LAN interface using the normal WiFi method≥and the wireless LAN interface using the WFD method. For this reason, a length of the predetermined time may be set so as to satisfy the wired LAN interface<the wireless LAN interface using the normal WiFi method≤the wireless LAN interface using the WFD method.

After waiting occurs for the predetermined amount of time in step S121, it is determined whether or not the inquired node name matches a node name of the interface which receives the inquiry (step S122). In the MFP 100 of the embodiment, in a case where a table 341 (FIG. 2) which stores an interface of the MFP 100 and a node name in correlation with each other is referred to, and a node name which matches the inquired node name is registered therein, it is determined that there is the inquired node name. On the other hand, in a case where a node name matching the inquired node name is not registered, it is determined that there is no inquired node name.

If there is not an inquired node name (NO in step S122), it may be determined that there is no inquiry to the MFP 100. For this reason, the node name checking process is finished without sending a response of an IP address.

If there is the inquired node name (YES in step S122), it is determined whether or not a response of an IP address has been sent to the PC 200 which an inquiry source apparatus of the name resolution through another interface (step S123). In the MFP 100 of the embodiment, in a case where response information corresponding to another interface is stored in the response information management table 332 as a result of referring to the response information stored in step S103, it is determined that a response of an IP address has been sent. If a response of an IP address has not been sent (NO in step S123), the flow proceeds to step S102 where a response of an IP address is sent, and the response information is stored in step S103.

If a response of an IP address has been sent (YES in step S123), it is determined whether or not an elapsed time from the time at which the response has already been sent through another interface is equal to or greater than a threshold value (step S124). The threshold value may be greater than the waiting time in step S121. In the embodiment, the threshold value may be, for example, five seconds. Even if there is a response record of an IP address, in a case where an elapsed time from the record is equal to or greater than the threshold value, there is a high possibility that the response is a response to an inquiry used in the previous work. Therefore, if the elapsed time is equal to or greater than the threshold value (YES in step S124), the flow proceeds to step S102 where a response of an IP address is sent, and the response information is stored in step S103. On the other hand, if the elapsed time is not equal to or greater than the threshold value (NO in step S124), the node name checking process is finished without sending a response of an IP address in order to avoid a response more than necessary, that is, repeated responses.

Next, a printing operation in a state in which a plurality of interfaces are under connection will be described based on the above-described node name checking process.

Figure 9:
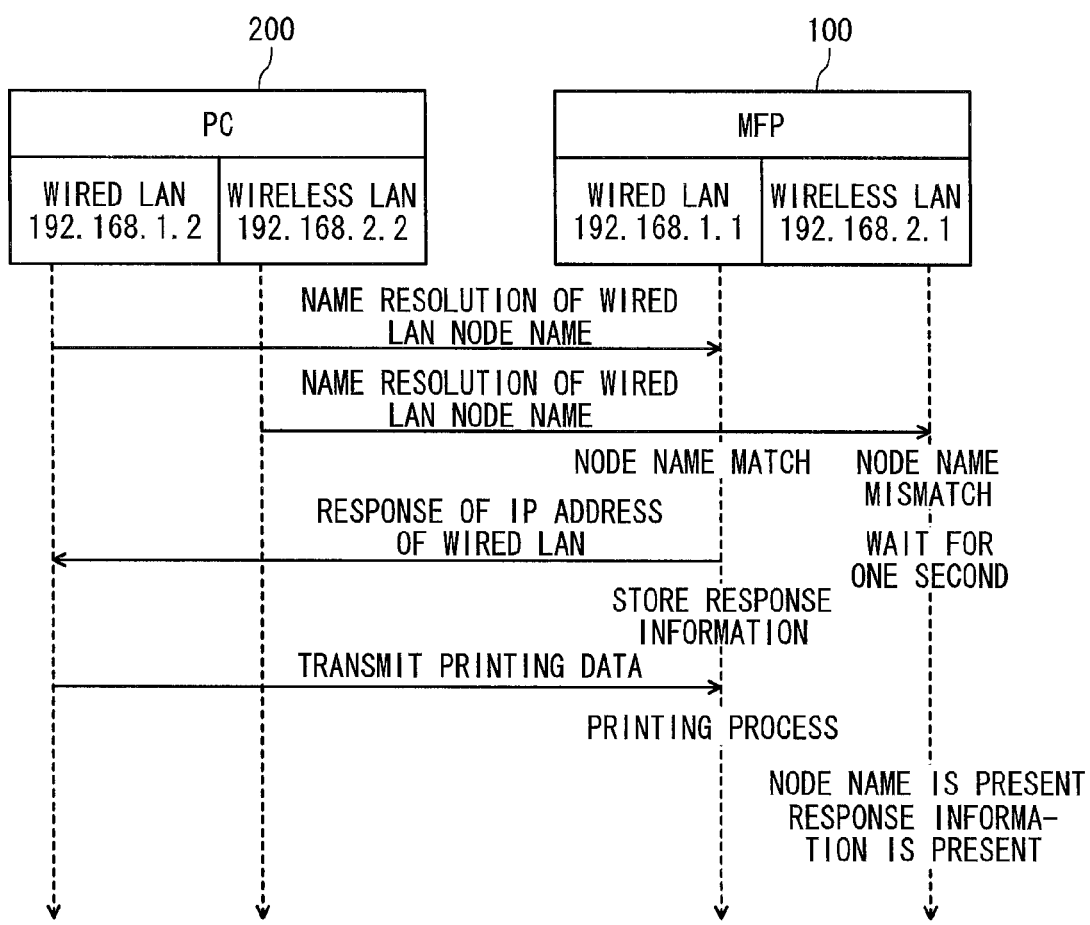
FIG. 9 is a sequence diagram illustrating a printing procedure in the image processing system according to the embodiment in a case where one of a plurality of interfaces is the same as an interface during installation in a state of connection with the plurality of interfaces.

First, with reference to a sequence diagram of FIG. 9, a description will be made of a printing operation in a state in which an interface (wired LAN interface) is under connection during installation and in a state in which other interfaces (wireless LAN interfaces) are under connection. The sequence diagram of FIG. 9 illustrates a process after a printing command is received and then a cache is erased, and does not illustrate the previous process.

When a printing command is received, the PC 200 performs name resolution using a node name (a node name of the wired LAN interface in the embodiment) acquired during installation, from each interface in a connection state. In the embodiment, the name resolution is performed on a node name of the wired LAN interface through the wired LAN, and the name resolution is performed on a node name of the wired LAN interface through the wireless LAN. The MFP 100 receives an inquiry of the name resolution from the PC 200 through each interface.

In the node name checking process performed when the inquiry is received through the wired LAN interface 37, the MFP 100 determines that the inquired node name matches a node name of the interface which receives the inquiry (YES in step S101), sends an IP address corresponding to the wired LAN interface (step S102), and stores the response information in the response information management table 332 (step S103). Consequently, printing data is transmitted from the PC 200 to the MFP 100 through the wired LAN.

On the other hand, in the node name checking process performed when the inquiry is received through the wireless LAN interface 38, the MFP 100 determines that the inquired node name does not match a node name of the interface which receives the inquiry (NO in step S101), and waits for one second which is a predetermined amount of time (step S121). Then, it is determined that there is a node name (YES in step S122), but the response information based on the response from the wired LAN interface 37 has already been stored in the response information management table 332, and thus it can be determined that a response of an IP address has been sent within a threshold time (YES in step S123 or NO in step S124). For this reason, a response of an IP address is not sent. Consequently, it is possible to prevent printing data from being transmitted from a plurality of interfaces.

Figure 10:
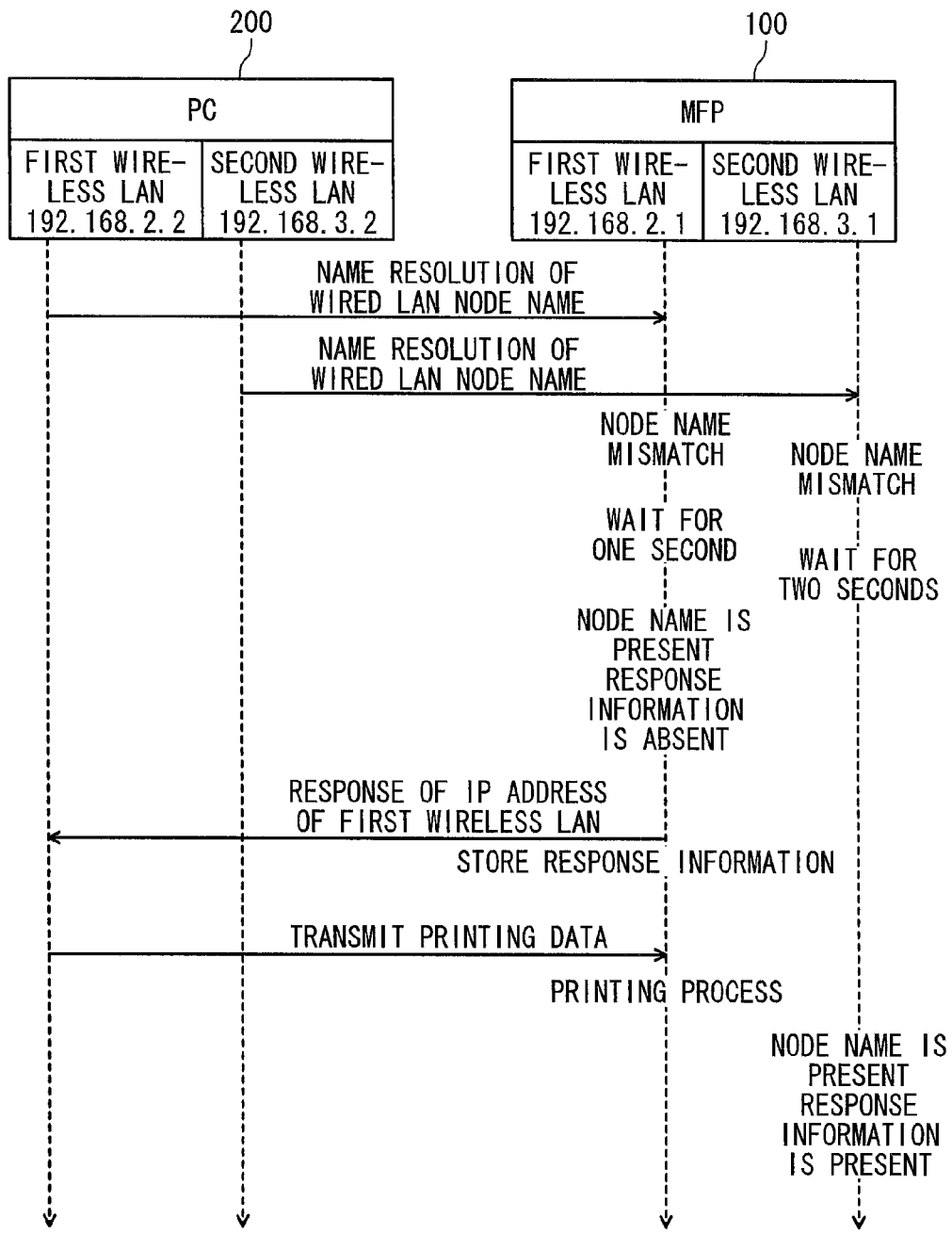
FIG. 10 is a sequence diagram illustrating a printing procedure in the image processing system according to the embodiment in a case where an interface during installation is not included in a plurality of interfaces in a state of connection with the plurality of interfaces.

Next, with reference to a sequence diagram of FIG. 10, a description will be made of a printing operation in a state in which a plurality of interfaces (a first wireless LAN interface and a second wireless LAN interface) different from the interface (wired LAN interface) under connection during installation are under connection. The sequence diagram of FIG. 10 also illustrates a process after a printing command is received and then a cache is erased, and does not illustrate the previous process. Further, it is assumed that the second wireless LAN has stability lower than that of the first wireless LAN, and thus the predetermined amount of time in step S121 of the node name checking process is set to two second whereas the predetermined amount of time of the first wireless LAN is set to one second.

When a printing command is received, the PC 200 performs name resolution using a node name (a node name of the wired LAN interface in this example) acquired during installation, from each interface in a connection state. In the embodiment, the name resolution is performed on a node name of the wired LAN interface through the first wireless LAN, and the name resolution is performed on a node name of the wired LAN interface through the second wireless LAN. The MFP 100 receives an inquiry of the name resolution from the PC 200 through each interface.

On the other hand, in the node name checking process performed when the inquiry is received through the first wireless LAN interface, the MFP 100 determines that the inquired node name does not match a node name of the interface which receives the inquiry (NO in step S101), and waits for a second which is a predetermined amount of time (step S121). Then, it is determined that there is a node name (YES in step S122), response information is not stored in the response information management table 332 (or even if the response information is stored in the response information management table 332, the threshold time has elapsed from the response of an IP address), it can be determined that a response of an IP address has not been sent (NO in step S123 or YES in step S124). For this reason, a response of an IP address corresponding to the first wireless LAN interface is sent (step S102), and the response information is stored in the response information management table 332 (step S103). Consequently, printing data is transmitted from the PC 200 to the MFP 100 through the first wireless LAN.

On the other hand, in the node name checking process performed when the inquiry is received through the second wireless LAN interface, the MFP 100 determines that the inquired node name does not match a node name of the interface which receives the inquiry (NO in step S101), and waits for two seconds which are a predetermined amount of time (step S121). Then, it is determined that there is a node name (YES in step S122), but the response information has already been stored in the response information management table 332, and thus it can be determined that a response of an IP address has been sent within a threshold time (YES in step S123 or NO in step S124). For this reason, a response of an IP address is not sent. Consequently, it is possible to prevent printing data from being transmitted from a plurality of interfaces.

As described in detail, in the MFP 100 of the embodiment, even when a node name corresponding to an interface during communication is supplied in installation for preparation communication and then a request for address information based on the node name is acquired, in a case where a request for address information is acquired through an interface different from the interface during the preparation communication, an IP address corresponding to the different interface is supplied. As mentioned above, since the IP address corresponding to the interface when the request for the identification information is acquired, communication can be performed by using the currently connected interface, and thus appropriate communication with the PC 200 can be expected.

In the embodiment, both communication of printing data using the wired LAN interface 37 and communication of printing data using the wireless LAN interface 38 are performed by using a single port monitor 732 which is installed during the installation of the printer driver. In other words, a plurality of interfaces share the port monitor 732. Consequently, in the embodiment, appropriate communication between the PC 200 and the MFP 100 can be expected without performing installation of a plurality of printer drivers by a user or without switching multiple port monitors.

The embodiment is described as a mere example, and does not limit the scope of the present invention. Therefore, naturally, the embodiment may be variously altered and modified within the scope of the present invention. For example, an electronic apparatus is not limited to an MFP, but may also be a scanner, a FAX apparatus, a printer, a copier, and similar apparatuses having network communication capability. In addition, an information processing apparatus is not limited to a PC, but may also be a smart phone, a tablet terminal, a main frame, and similar apparatuses having network communication capability.

Further, in the embodiment, transmission of printing data is described, however the present invention may not be limited to the transmission of printing data. For example, the present invention may be applied to transmission and reception of read data (scanned data which is generated through a scanning process). An installation process is performed in the transmission and reception of read data in the same as in the transmission and reception of printing data. In the transmission of read data, name resolution is performed by using a node name held in the port monitor 732 when a reading command is input to the PC 200 in the same manner as in a case where printing data is transmitted, and a read data transmission instruction is transmitted from the PC 200 through an interface whose name is resolved. The read data may be received from a scanner which receives the transmission instruction.

Further, in the embodiment, it is described that, in a case where an inquiry of a node name different from a node name during installation is received, waiting is set for a predetermined amount of time, however, waiting may not be set. If the waiting is not set, earlier communication can be expected. On the other hand, if the waiting is set, the presence or absence of responses from other interfaces can be determined, and thus it is possible to prevent printing data from being transmitted from multiple interfaces.

Still further, in the embodiment, it is described that apparatus information of an apparatus (response destination apparatus) which performs an inquiry is stored as response information, but the response information may not be information for specifying an apparatus. For example, the response information may be information for specifying an interface.

In addition, in the embodiment, a communication cache is erased in the PC 200, but may not be erased. However, in a case where a cache remains, printing data is transmitted based on the cache information without performing name resolution. For this reason, in a case where connection occurs through an interface different from the cache information, transmission of printing data fails. Therefore, since there is a reduction in a chance to send a response of an IP address through name resolution using the cache information, it is possible to increase a possibility of performing appropriate communication with the PC 200 by erasing a cache.

The process described for the embodiment may be performed by any types of processors such a single CPU, a plurality of CPUs, hardware such as an ASIC, or a combination thereof. Still further, the process described in the embodiment may be realized in various aspects such as a method or a computer-readable storage medium containing a computer program for a processor to perform the process.

What is claimed is:
1. An electronic apparatus comprising:
  a plurality of communication interfaces including a first communication interface and a second communication interface each of which configured to perform communication with an information processing apparatus through a network;
  a processor; and
  memory configured to store:
  first correspondence information including first identification information for identifying the electronic apparatus in a communication using the first communication interface and first address information of the electronic apparatus in correlation with each other,
  second correspondence information including second identification information for identifying the electronic apparatus in a communication using the second communication interface and second address information of the electronic apparatus in correlation with each other, the second identification information being different from the first identification information and the second address information being different from the first address information; and
  instructions, when executed by the processor, causing the electronic apparatus to:
  receive an identification information inquiry from the information processing apparatus through the first communication interface in preparation communication that is performed prior to communication of target data with the information processing apparatus;
  send, to the information processing apparatus when the identification information inquiry is received, the first identification information through the first communication interface;
  receive an address information request sent from the information processing apparatus using the first identification information due to a predetermined instruction for performing the communication of target data being input to the information processing apparatus;
  send, to the information processing apparatus, in a case where identification information assigned to a communication interface through which the address information request is received matches the first identification information included in the address information request, the first address information corresponding to the first identification information;

send, to the information processing apparatus, in a case where identification information assigned to the communication interface through which the address information request is received does not match the first identification information included in the address information request and the first identification information is stored in the memory, address information corresponding to the communication interface which the address information request is received; and perform the communication of the target data with the information processing apparatus after sending one of the first address information and the address information to the information processing apparatus.

2. The electronic apparatus according to claim 1, wherein the memory stores instructions, when executed by the processor, causing the electronic apparatus to:

receive a name resolution request using the first identification information as the address information request;

determine whether or not identification information corresponding to one of the communication interfaces used when the address information request is received matches the first identification information;

send, to the information processing apparatus, the first address information in a case where the determined identification information matches the first identification information; and send, to the information processing apparatus, address information corresponding to the communication interface through which the address information request is received in a case where the identification information does not match the first identification information.

3. The electronic apparatus according to claim 1, wherein the memory stores instructions, when executed by the processor, causing the electronic apparatus to:

wait for a predetermined time period in a case where the address information request is received from the information processing apparatus through the second communication interface;

determine whether or not any address information is sent to the information processing apparatus from one of the communication interfaces different from the second communication interface during the predetermined time period; and send, to the information processing apparatus, the second address information when the predetermined time period is elapsed in a case where determined that no address information is sent to the information processing apparatus from one of the communication interfaces different from the second communication interface during the predetermined time period.

4. The electronic apparatus according to claim 3, wherein the memory is configured to store response information that indicates information regarding a response sent from the electronic apparatus in response to the address information being sent, and wherein the memory stores instructions, when executed by the processor, causing the apparatus to:

send the second address information to the information processing apparatus in a case where there is no information regarding a response corresponding to the address information request that is received from the information processing apparatus, in the response information corresponding to the communication interfaces different from the second communication interface, which is stored in the memory.

5. The electronic apparatus according to claim 4, wherein the memory is configured to store the response information including information regarding time at which the address information is sent for each communication interface included in the plurality of communication interfaces, and wherein the memory stores instructions, when executed by the processor, causing the apparatus to:

send the second address information to the information processing apparatus in a case where there is information regarding a response corresponding to the address information request that is received from the information processing apparatus in the response information corresponding to a communication interface different from the second communication interface, which being stored in the memory, and where an elapsed time from a time included in the information exceeds a threshold time which is longer than the predetermined time period.

6. The electronic apparatus according to claim 5, wherein the threshold time is set for each of the communication interfaces depending on a type of each communication interface to be longer as communication reliability of each communication interface is lower compared to other communication interfaces included in the communication interfaces.

7. The electronic apparatus according to claim 1, wherein the address information request is a request sent from the information processing apparatus when the predetermined instruction is input to the information processing apparatus.

8. The electronic apparatus according to claim 1, wherein the first identification information and the second identification information are a node name, and wherein the first address information and the second address information are an IP address assigned, respectively to the first communication interface and the second communication interface.

9. A method for controlling an electronic apparatus, the electronic apparatus having a plurality of communication interfaces including a first communication interface and a second communication interface each of which configured to perform communication with an information processing apparatus through a network, and storing first correspondence information and second correspondence information, the first correspondence information including first identification information for identifying the electronic apparatus in communication using the first communication information and first address information of the electronic apparatus in correlation with each other, the second correspondence information including second identification information for identifying the electronic apparatus in a communication using the second communication interface and second address information of the electronic apparatus in correlation with each other, the second identification information being different from the first identification information and the second address information being different from the first address information, the method comprising:

receiving an identification information inquiry from the information processing apparatus through the first communication interface in preparation communication that is performed prior to communication of target data with the information processing apparatus;

sending, to the information processing apparatus when the identification information inquiry is received, the first identification information through the first communication interface;

receiving an address information request sent from the information processing apparatus using the first identification information due to a predetermined instruction for performing the communication of target data being input to the information processing apparatus;

sending, to the information processing apparatus, in a case where identification information assigned to a communication interface through which the address information request is received matches the first identification information included in the address information request, the first address information corresponding to the first identification information;

sending, to the information processing apparatus, in a case where identification information assigned to the communication interface through which the address information request is received does not match the first identification information included in the address information request and the first identification information is stored, address information corresponding to the communication interface which the address information request is received; and performing the communication of the target data with the information processing apparatus after sending one of the first address information and the address information to the information processing apparatus.

10. A non-transitory computer-readable medium having instructions to control an electronic apparatus, the electronic apparatus having a plurality of communication interfaces including a first communication interface and a second communication interface each of which configured to perform communication with an information processing apparatus through a network, and storing first correspondence information and second correspondence information, the first correspondence information including first identification information for identifying the electronic apparatus in communication using the first communication information and first address information of the electronic apparatus in correlation with each other, the second correspondence information including second identification information for identifying the electronic apparatus in a communication using the second communication interface and second address information of the electronic apparatus in correlation with each other, the second identification information being different from the first identification information and the second address information being different from the first address information, the instructions causing the electronic apparatus to perform:

receiving an identification information inquiry from the information processing apparatus through the first communication interface in preparation communication that is performed prior to communication of target data with the information processing apparatus;

sending, to the information processing apparatus when the identification information inquiry is received, the first identification information through the first communication interface;

receiving an address information request sent from the information processing apparatus using the first identification information due to a predetermined instruction for performing the communication of target data being input to the information processing apparatus;

sending, to the information processing apparatus, in a case where identification information assigned to a communication interface through which the address information request is received matches the first identification information included in the address information request, the first address information corresponding to the first identification information;

sending, to the information processing apparatus, in a case where identification information assigned to the communication interface through which the address information request is received does not match the first identification information included in the address information request and the first identification information is stored, address information corresponding to the communication interface which the address information request is received; and performing the communication of the target data with the information processing apparatus after sending one of the first address information and the address information to the information processing apparatus.

* * * * *